United States Patent

Greener

[11] Patent Number: 5,222,475
[45] Date of Patent: Jun. 29, 1993

[54] BARBEQUE GRILL APPARATUS

[76] Inventor: Donald Greener, Rte. 1, Box 92, Burlington, Tex. 76519

[21] Appl. No.: 948,114

[22] Filed: Sep. 21, 1992

[51] Int. Cl.⁵ .............................................. F24C 3/00
[52] U.S. Cl. ............................ 126/41 R; 126/25 R; 126/39 R; 99/403
[58] Field of Search ............. 126/41 R, 25 R, 25 AA, 126/41 A, 41 b, 39 R; 99/467, 339, 345, 403, 467

[56] References Cited

U.S. PATENT DOCUMENTS

| | | | |
|---|---|---|---|
| 3,964,463 | 6/1976 | Darley | 126/41 R |
| 4,512,249 | 4/1985 | Mentzel | 126/9 B X |
| 4,554,864 | 11/1985 | Smith et al. | 126/9 R X |
| 4,672,944 | 6/1987 | Curny | 126/25 R |
| 4,762,114 | 8/1988 | Blankemeyer | 126/25 R X |
| 4,809,671 | 3/1989 | Vallejo, Jr. | 126/41 R |
| 4,877,011 | 10/1989 | Willice | 126/25 R |
| 4,944,284 | 7/1990 | O'Quin | 126/41 R |
| 4,957,039 | 9/1990 | Reyes | 126/25 R |
| 5,094,223 | 3/1992 | Gonzalez | 126/41 R X |
| 5,168,796 | 12/1992 | Porton | 126/41 R X |

Primary Examiner—Larry Jones
Attorney, Agent, or Firm—Leon Gilden

[57] ABSTRACT

A barbeque grill is arranged to include a removable hood having secured thereto a fry pot and an overlying hood having a second grill spaced above the first grill mounting briquets thereon. The hood is arranged to include an adjustable venting structure to an upper distal end of the hood coaxially aligned relative to the hood to permit selective venting of heat within the hood.

3 Claims, 5 Drawing Sheets

BARBEQUE GRILL APPARATUS

BACKGROUND OF THE INVENTION

1. Field of the Invention

The field of invention relates to barbeque grill apparatus, and more particularly pertains to a new and improved barbeque grill apparatus wherein the same is arranged for the selective positioning of a cooking grid or a pot member to an underlying barbeque grill grate.

2. Description of the Prior Art

Barbeque grills of various types have been utilized throughout the prior art and exemplified in U.S. Pat. Nos. 4,913,041 and 4,848,317. Barbeque grills of the prior art have typically been of a single use construction, wherein the instant invention attempts to overcome deficiencies of the prior art by permitting the use of a smoker hood as well as a fry pot structure arranged for mounting to the underlying barbeque grill structure of the invention and in this respect, the present invention substantially fulfills this need.

SUMMARY OF THE INVENTION

In view of the foregoing disadvantages inherent in the known types of barbeque grill apparatus now present in the prior art, the present invention provides a barbeque grill apparatus wherein the same is arranged to permit selective positioning of a fry pot or smoker hood relative to an underlying barbeque grate. As such, the general purpose of the present invention, which will be described subsequently in greater detail, is to provide a new and improved barbeque grill apparatus which has all the advantages of the prior art barbeque grill apparatus and none of the disadvantages.

To attain this, the present invention provides a barbeque grill arranged to include a removable hood having secured thereto a fry pot and an overlying hood having a second grill spaced above the first grill mounting briquets thereon. The hood is arranged to include an adjustable venting structure to an upper distal end of the hood coaxially aligned relative to the hood to permit selective venting of heat within the hood.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved barbeque grill apparatus which has all the advantages of the prior art barbeque grill apparatus and none of the disadvantages.

It is another object of the present invention to provide a new and improved barbeque grill apparatus which may be easily and efficiently manufactured and marketed.

It is a further object of the present invention to provide a new and improved barbeque grill apparatus which is of a durable and reliable construction.

An even further object of the present invention is to provide a new and improved barbeque grill apparatus which is susceptible of a low cost of manufacture with regard to both materials and labor, and which accordingly is then susceptible of low prices of sale to the consuming public, thereby making such barbeque grill apparatus economically available to the buying public.

Still yet another object of the present invention is to provide a new and improved barbeque grill apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
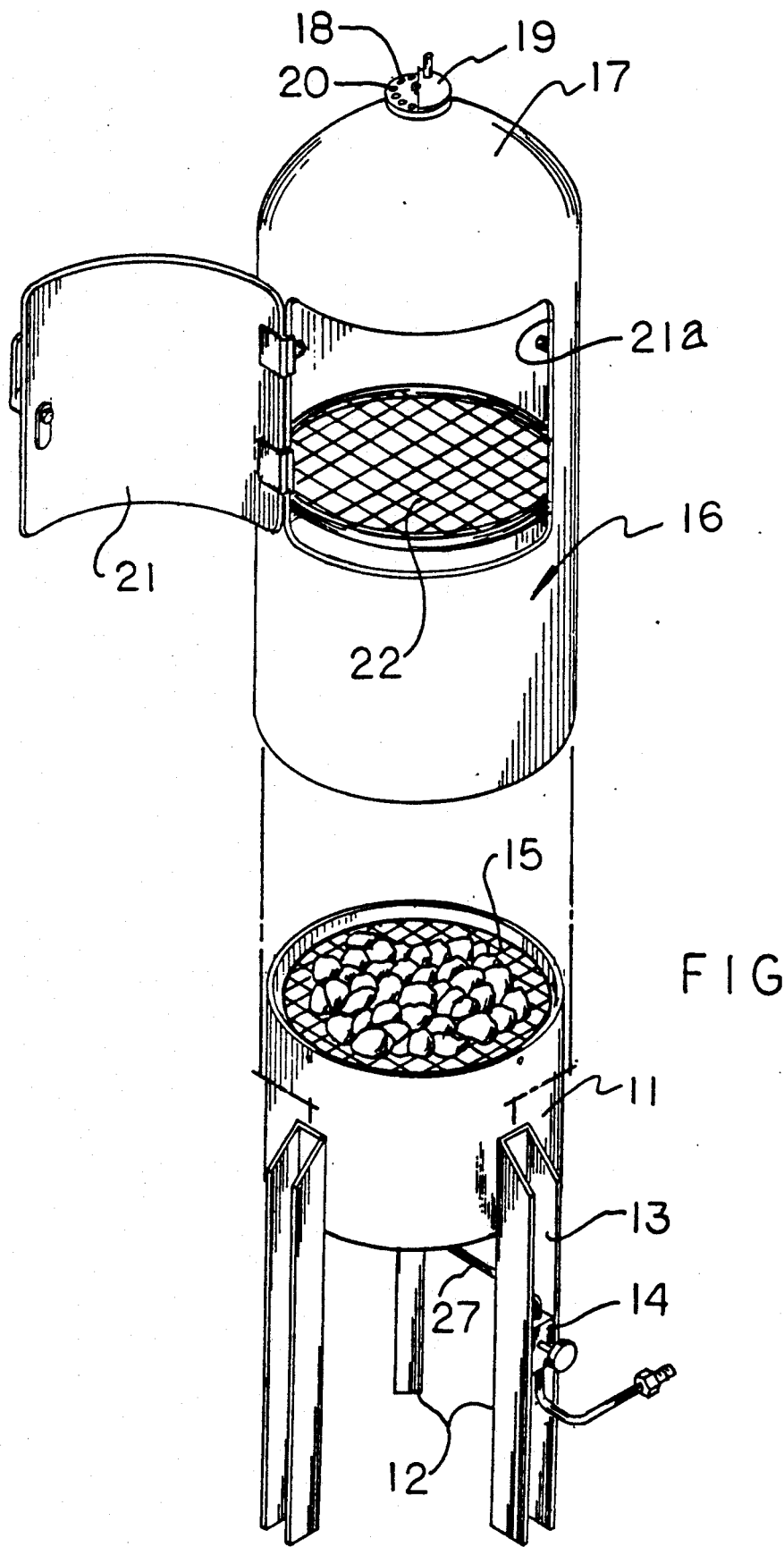
FIG. 1 is an isometric illustration of the invention employing a smoker hood.

With reference now to the drawings, and in particular to FIGS. 1 to 6 thereof, a new and improved barbeque grill apparatus embodying the principles and concepts of the present invention and generally designated by the reference numerals 11-45 will be described.

More specifically, the barbeque grill apparatus of the invention essentially comprises a cylindrical support housing 11 having a plurality of housing legs 12 extending downwardly therefrom, with at least one of the legs 12 having a channel cavity 13 directed therewithin mounting a control valve 14. The control valve 14 effects flow of combustible gas through the associated gas conduit 27. The conduit 27 directs gas into a gas flame plate 30, as indicated in FIG. 3 to be discussed in more detail below.

Figure 3:
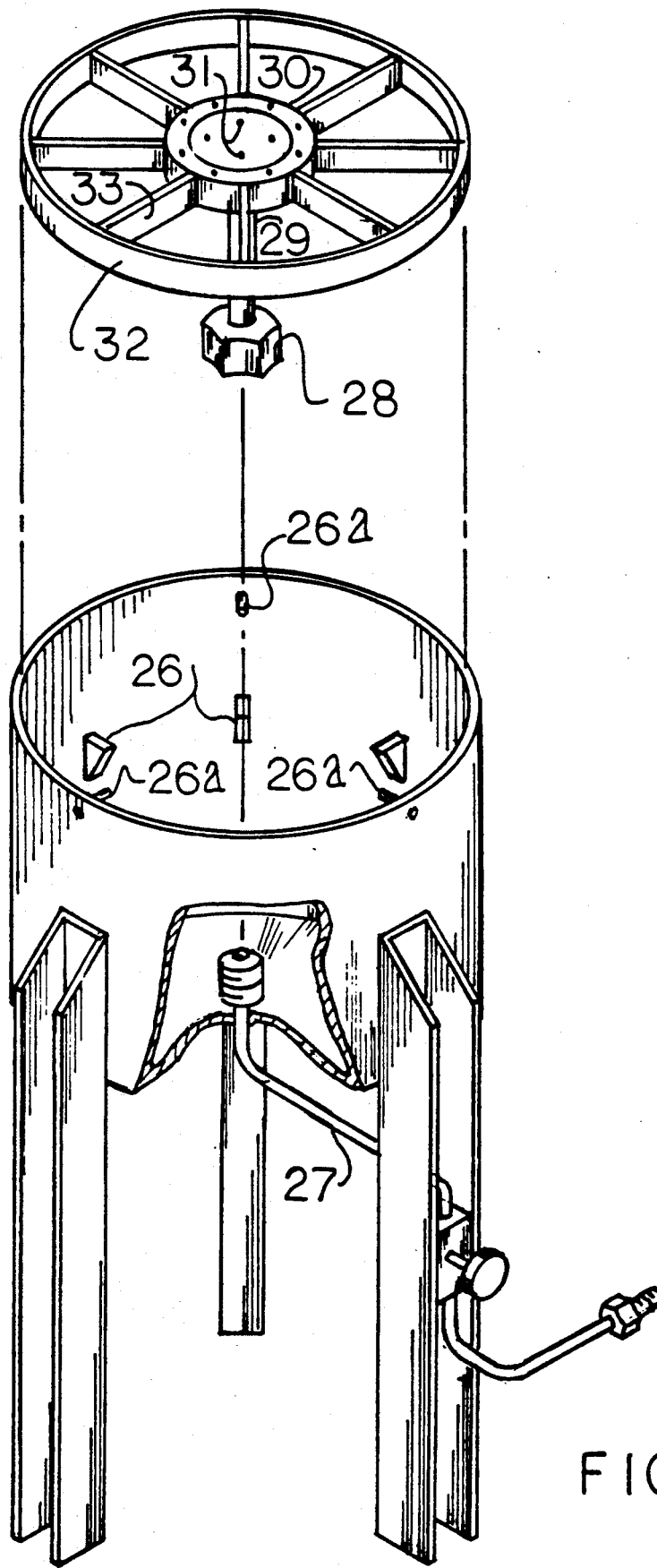
FIG. 3 is an isometric illustration of the support housing mounting the associated gas flame plate.

The support housing 11 includes a first support grill 15 mounted upon a first annular array of first support lugs 26a mounted adjacent the upper periphery of the support housing 11 (see FIG. 3). A cover hood 16 is provided, with the cover hood having a hood roof 17 mounting an apertured plate 18 medially of the roof 17, with the apertured plate 18 having a cover flange 19 arranged for selective exposure of selective individual openings 20 through the apertured plate 18 to control heat flow from the cover hood 16. A second support grill 22 is mounted within the cover hood 16 mounted upon a second annular array of support lugs 34 positioned in adjacency to a lower end portion of a door plate opening 21a, with the door plate 21 mounted to the hood 16 to selectively cover the opening 21a. The second support grill 22 is arranged to accommodate various food components thereon for cooking as the briquets, as indicated in FIG. 1, are positioned upon the first support grill 15. The aforenoted gas flame plate 30 includes a plurality of gas flame plate ports 31 directed therethrough in communication with the gas conduit 27. A directional tube 29 is in pneumatic communication with the gas conduit 27 and the gas flame plate 30. An annular support rim 32 is provided having a plurality of spokes 33 directed from the support rim 32 radially to the gas flame plate 30. The support rim 32 is mounted upon an annular array of third support lugs 26 positioned below the first support lugs 26a.

Figure 2:
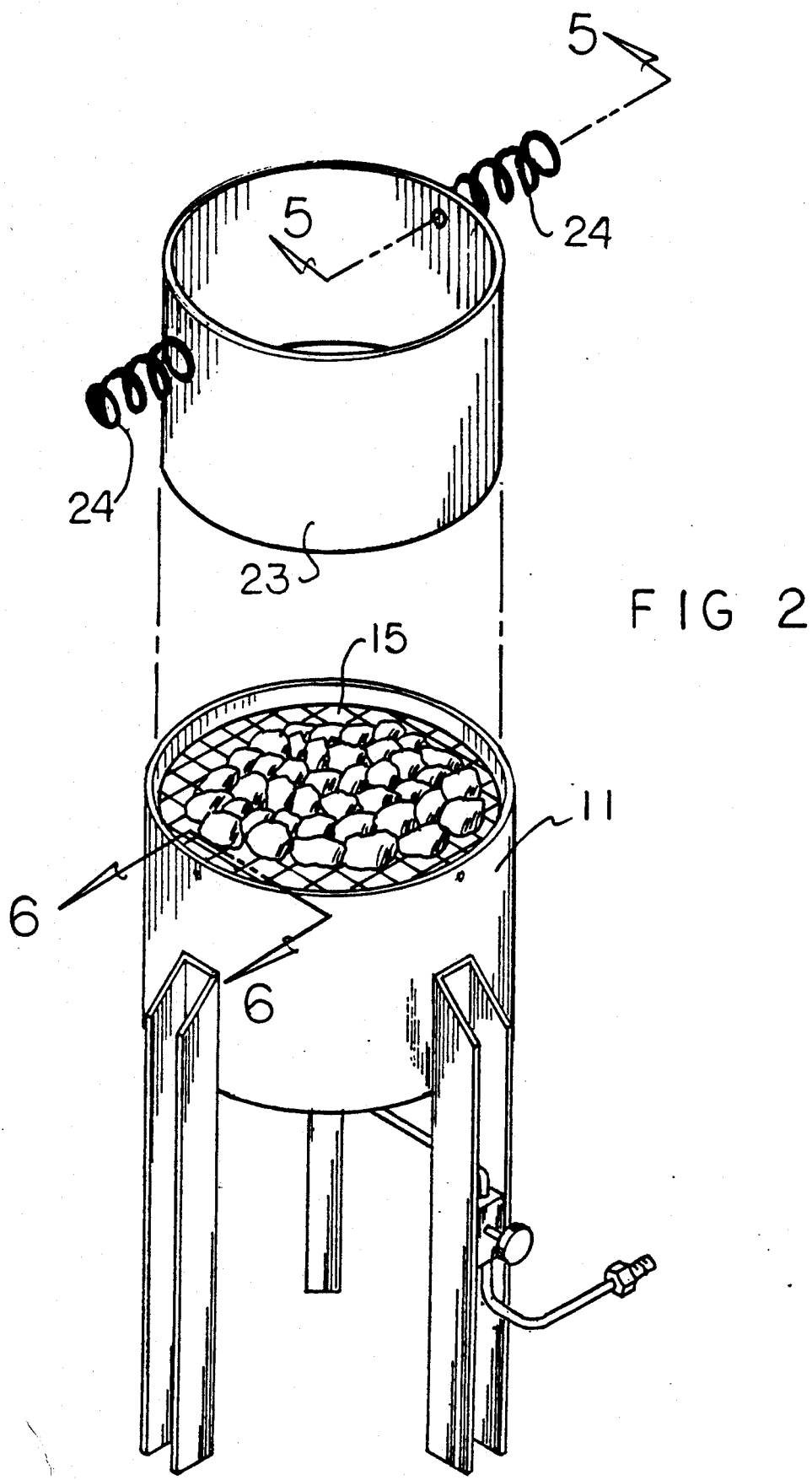
FIG. 2 is an isometric illustration of the invention employing a fry pot structure.

The FIG. 2 indicates the use of a cylindrical fry pot 23 arranged for positioning upon the support housing 11, with the fry pot having a plurality of spring handles 24 diametrically aligned on opposed sides of the fry pot for positioning the fry pot and its manipulation. Each of the spring handles 24 are secured to the fry pot through a heat insulating ring 25 (see FIG. 5) to insulate heat directed from the fry pot to the spring handles 24.

Figures 4, 4A:
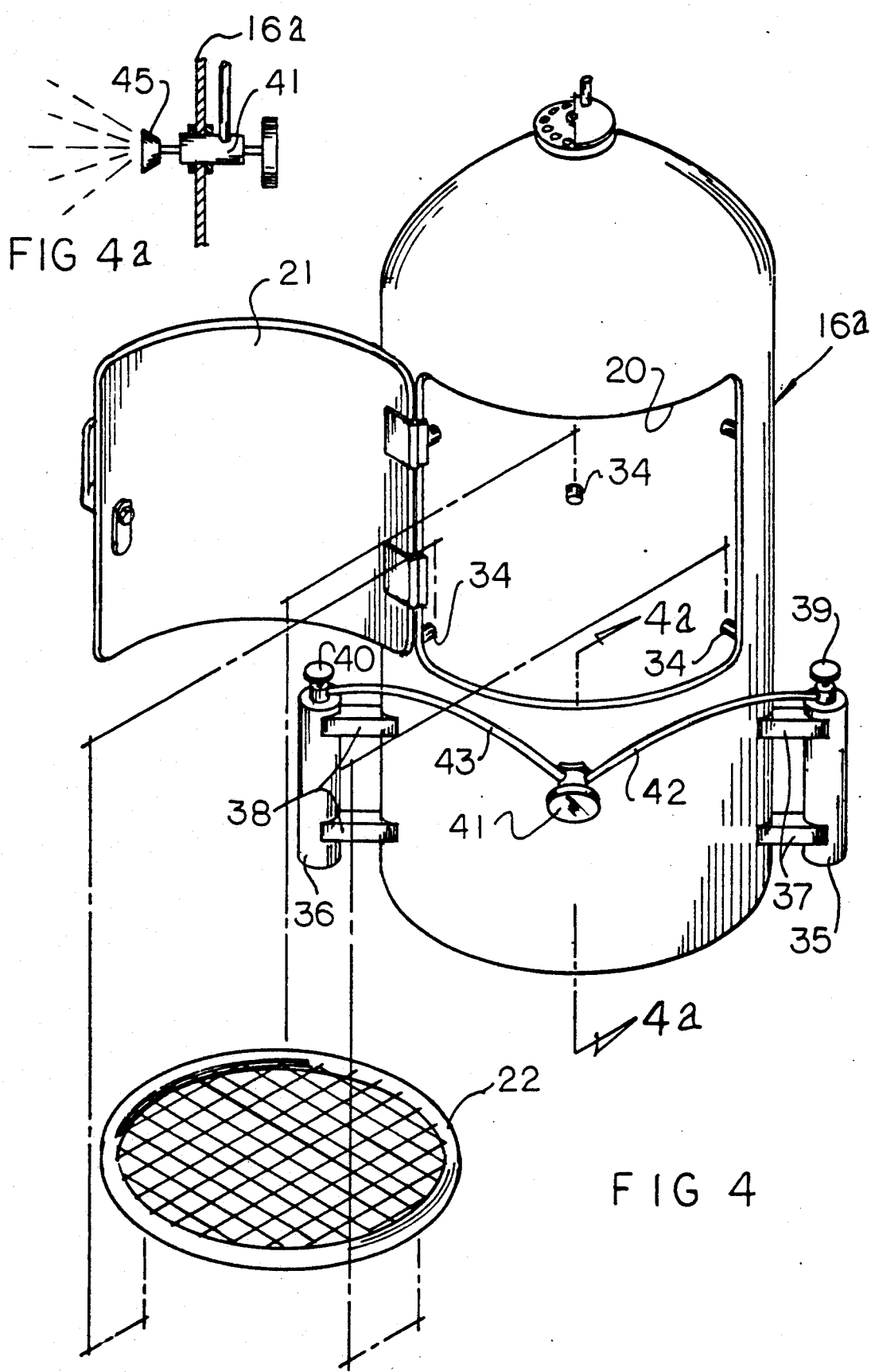
FIG. 4 is an isometric illustration of a modified hood structure of the invention.
FIG. 4a is an orthographic view, taken along the lines 4a—4a of FIG. 4 in the direction indicated by the arrows.
Figure 5:
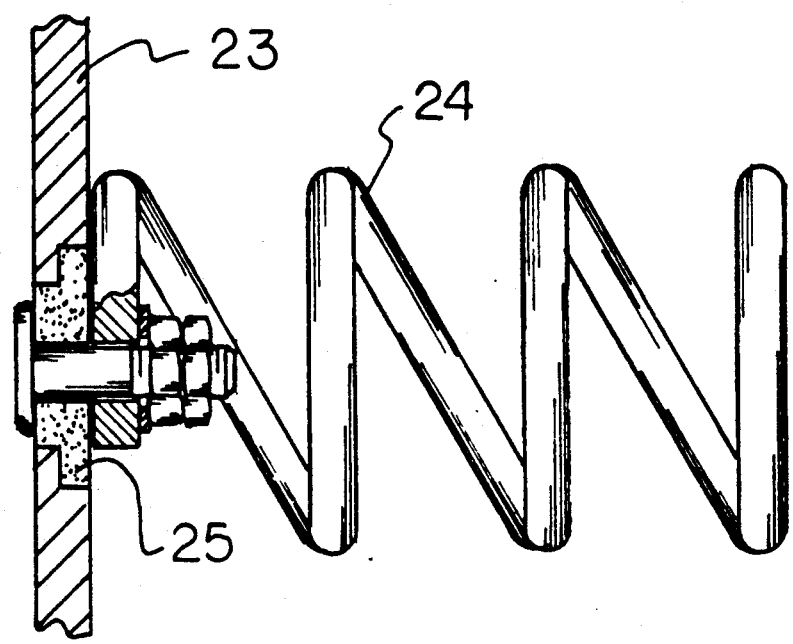
FIG. 5 is an orthographic view, taken along the lines 5—5 of FIG. 2 in the direction indicated by the arrows.
Figure 6:
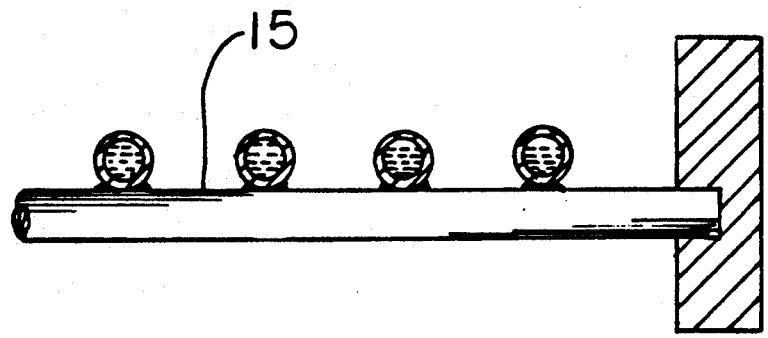
FIG. 6 is an orthographic view, taken along the lines 6—6 of FIG. 2 in the direction indicated by the arrows.

The FIGS. 4 and 4a indicate the use of respective first and second pressurized reservoir containers 35 and 36 having respective first and second magnetic mounts 37 and 38 for magnetic adherence of the containers to the modified hood structure 16a. Respective first and second control valves 39 and 40 are mounted to the respective first and second containers 35 and 36 to direct various fluid scents therefrom. Such scents to include various smoke flavoring such as hickory and mesquite wood flavoring directed through a central control valve 41 that is positioned between the second support grill 22 and over the first support grill 15 to thereby direct the pressurized fluid onto the briquets and direct such vaporized fluid onto food components positioned upon the second support grill 22. The first and second conduits 42 and 43 direct the fluid from the respective first and second control valves 39 and 40 to the central control valve 41. The control valve 41 mounted to the modified hood 16a is in communication with the spray nozzle 45 positioned interiorly of the hood 16a (see FIG. 4a) to properly orient and position the directed spray from the reservoir containers.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A barbeque grill apparatus, comprising,
    a cylindrical support housing, the cylindrical housing having a plurality of legs extending downwardly therefrom, wherein each one of the legs includes a channel cavity, and the channel cavity includes a control valve therewithin, wherein the control valve is afforded protection within the channel cavity, and
    a gas conduit directed from a flammable gas supply through the control valve into the support housing from the control valve, and
    an annular array of first support lugs mounted within the support housing adjacent an upper periphery of the support housing, and the first support lugs include a first support grill positioned thereon, and
    a cover hood, the cover hood having a cover hood roof, and
    a cover hood opening directed through the cover hood, with a door mounted within the opening to permit selective access through the cover hood through the opening, and
    a second annular array of lugs mounted within the cover hood in adjacency to a lower end portion of the opening, and
    a second support grill mounted upon the support lugs, and
    a third annular array of support lugs mounted within the support housing below the first annular array of support lugs, and
    annular support rim mounted upon the third support lugs, and
    a gas flame plate mounted medially of the support rim, and a plurality of spokes directed from support rim to the gas flame plate, with the gas flame plate including a plurality of gas flame plate ports, and
    a directional tube in pneumatic communication between the gas flame plate ports and the gas conduit.

2. An apparatus as set forth in claim 1 wherein the cover hood is removably mounted relative to the support housing, and a fry pot, the fry pot arranged for selective positioning upon the support housing, with the fry pot having fry pot handles, the fry pot handles of spring configuration, and each fry pot handle having an insulative connector mounting each respective fry pot handle to the fry pot.

3. An apparatus as set forth in claim 2 wherein the cover hood includes at least one pressurized reservoir container, the reservoir container having a control valve, and the reservoir container having a magnetic mount to selective adhere the reservoir container to the cover hood, and a control valve fixedly mounted to the cover hood below the second support grill and above a lower distal end of the cover hood, with a spray nozzle positioned within the cover hood below the second support grill, and a conduit member in fluid communication between the reservoir container and the control valve to selectively direct a fluid from the reservoir container through the spray nozzle between the second support grill and the first support grill.

* * * * *